Jan. 29, 1929.
F. WETTSTEIN
1,700,650
STEAM PLANT
Filed Aug. 16, 1926
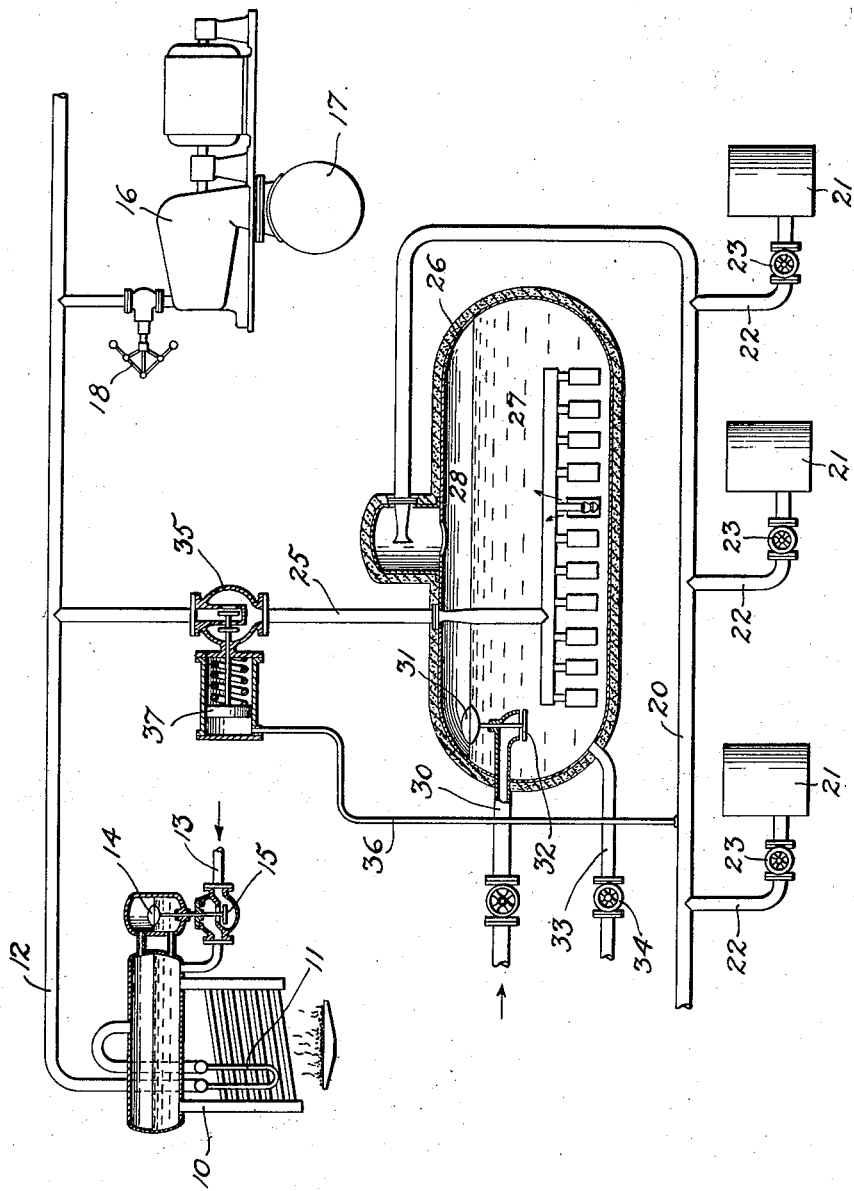
INVENTOR
Fritz Wettstein
BY
Wm T Sedlund
his ATTORNEY Patented Jan. 29, 1929.

1,700,650

UNITED STATES PATENT OFFICE.

FRITZ WETTSTEIN, OF SUMMIT, NEW JERSEY, ASSIGNOR TO RUTHS ACCUMULATOR COMPANY, INCORPORATED, OF NEW YORK, N. Y., A CORPORATION OF DELAWARE.

STEAM PLANT.

Application filed August 16, 1926. Serial No. 129,298.

In one phase, my invention consists in a novel desuperheater and a novel method of desuperheating. In order to transfer superheated steam into dry and saturated steam I pass the superheated steam through a large body of water so that intimate contact of steam with water is obtained, giving perfect saturated steam.

In another phase, my invention relates to process work in industrial plants and more particularly to temperature control of steam for use in processes. The majority of steam plants in industrial plants, at least those of appreciable size, generate superheated steam. Superheated steam is primarily generated because of its advantages in use in the ordinary types of prime movers. Superheated steam, being generated for the above and other purposes, is also used for process work. Many processes require close regulation of temperature. In using superheated steam temperature responsive regulators are necessary. Temperature regulators are never as sensitive as pressure regulators but pressure regulators cannot be used with superheated steam because there is no relation between temperature and pressure in superheat.

My present invention relates to plants generating superheated steam and has for one purpose to control the temperature of steam supplied to process work, the temperature being controlled by a novel combination of pressure control and desuperheating.

My invention is illustrated in the accompanying drawing which shows a steam plant or parts of a steam plant, more or less diagrammatically, laid out in accordance with the invention.

Reference character 10 designates the plant steam generator which may comprise one or more boilers of any desired type. Steam generated in the steam generator passes through a superheater 11 and thence to a main high pressure conduit 12. Feed water is supplied to the steam generator through conduit 13 and regulated by any desired feed water regulator such as a float 14 controlling valve 15 in conduit 13. The steam generator is fired and regulated in the usual manner, in accordance with steam demand.

Superheated steam is supplied from conduit 12 to turbine 16. The turbine 16 may be of any type. A condensing turbine is indicated by way of example comprising a condenser 17. Supply of steam to the turbine is controlled by speed governor 18.

Reference character 20 designates a low pressure conduit in the steam plant to which steam consumers 21 are connected. The steam consumers 21 are connected to conduit 20 by means of branch conduits 22 controlled by valves 23. The steam plant indicated may be considered as a portion of a rubber plant and consumers 21 may be considered to be vulcanizing presses. It is extremely necessary that a constant temperature be obtained in presses 21. This has previously been obtained by conducting superheated steam from conduit 12 to conduit 20 and interposing temperature regulators in place of valves 23 governed by the temperature in branch conduits 22. In the preferred form of my invention I propose to eliminate the temperature controls and substitute ordinary hand valves 23 and control the temperature of steam in conduit 20 as will now be described.

A conduit 25 conducts superheated steam from conduit 12 to the water space of an extremely large receptacle 26. Receptacle 26 has a water space 27 and a steam space 28. It is preferably made so as to have a large water surface or steam disengaging surface. If all the generated superheated steam passes through receptacle 26, the steam disengaging surface of receptacle 26 should be greater than the total steam disengaging surface of steam generator 10 if ordinary boilers are used to make up the steam generator. Receptacle 26 is a desuperheater. Conduit 20 is connected to the steam space of desuperheater 26. It will be seen from the above description and the accompanying drawing that, if the desuperheater is maintained filled with water to the necessary amount, the steam passing through the desuperheater and into conduit 20 will become saturated. I am aware that it is not new to desuperheat steam. This has previously been done by injecting water into a steam conduit. This system of water injection is inefficient to properly desuperheat. A spray is formed and some of the water remains as water and it is possible to have superheated steam in contact with water. By passing the superheated steam through an appreciable sized body of water, a true desuperheated effect is obtained and the result will be dry and saturated steam. As the superheated steam is desuperheated it evaporates water in desuperheater 26. The water in desuperheater 26 is replenished by means of a water supply conduit 30. The supply of water through conduit 30 may be regulated by hand or it may be automatically regulated as by means of a float 31 controlling a valve 32 which valve governs the flow of water from conduit 30 into desuperheater 26. Conduit 33 is another water supply conduit and is controlled by a hand valve 34. This conduit controlled by a hand valve can be used independently of conduit 30 or in conjunction therewith.

In conduit 25 is a valve 35 controlling flow through the same which valve is moved in response to variation of pressure occurring in conduit 20 and transmitted through tube 36 onto one side of piston 37. Any kind of valve regulation may be used so long as it operates to decrease flow through conduit 25 upon rise of pressure in conduit 20 and to increase flow upon drop of pressure in conduit 20 and tends to maintain a constant pressure in conduit 20. By means of this regulation the pressure in conduit 20 can be made exact and so that it will vary only within fractions of a pound. This will give a temperature variation of the saturated steam in conduit 20 of very minute degree. Besides utilizing the ability of a pressure regulator to maintain a closer control than temperature regulation, I have utilized the fact that there is a relatively small variation of temperature for a relatively large variation of pressure.

While I have stated that I prefer to eliminate the temperature control, it is obvious that this may be used in conjunction with pressure control above outlined and by such arrangement a more exact temperature will be obtained than has been previously the case.

It will be noted that the control of the steam is the control of the superheated steam ahead of the desuperheater. There is no valve in conduit 20. The reason for controlling the steam ahead of the desuperheater is to eliminate any throttling effect after the steam has passed through the desuperheater and become dry and saturated.

While I have described one form of my invention it is to be understood that the invention is not limited thereto.

Having thus described my invention, what I claim is—

1. In combination, a source of superheated steam, a desuperheater comprising a receptacle containing water, means to conduct steam from said source and into said desuperheater to pass through the water therein, a conduit for conveying steam from said desuperheater and means to control flow of steam to the desuperheater in response to pressure of steam leaving the desuperheater to maintain said pressure constant.

2. The method of generating and dispensing steam which comprises generating superheated steam, passing the superheated steam through a body of water and controlling the flow of steam through the body of water in accordance with variations of pressure in the saturated steam leaving the body of water.

3. The method of generating and dispensing steam which comprises generating superheated steam, passing the superheated steam through a body of water and in contact therewith and controlling the flow of steam through the body of water so that the steam has a constant pressure after leaving the body of water.

4. In combination, a steam generator, means to supply water to said steam generator, water level responsive means to control supply of feed water to the steam generator, a superheater, means to conduct steam from said generator to said superheater, a desuperheater comprising a receptacle having a water space and a steam space, a passage for steam from said superheater to the water space of said desuperheater, a valve in said passage, a steam conduit connected to the steam space of said desuperheater for supplying steam to use, means responsive to pressure in said conduit for controlling said valve and operating to increase flow through the valve on decrease of pressure, means to supply water to said desuperheater and mechanism responsive to water level in said desuperheater to control the supply of water to the desuperheater.

5. In combination, a source of superheated steam, a desuperheater comprising a receptacle containing water and having a water space and a steam space, a passage for steam from said source to the water space of said desuperheater, a consumer, an uninterrupted conduit for steam from the steam space of said desuperheater to the vicinity of the consumer for supplying steam to the consumer, a valve in said passage to control flow of steam from the source to the desuperheater and automatic means to control the valve to maintain a constant temperature of steam in said conduit.

6. In combination, a source of superheated steam, a desuperheater comprising a receptacle containing water, means to conduct steam from said source and into said desuperheater to pass through the water therein, a conduit for conveying steam from said desuperheater, means to supply water to said desuperheater and maintain a constant water level therein and means to control flow of steam into the desuperheater in response to pressure of steam leaving the desuperheater to maintain said pressure constant.

7. The method of desuperheating which comprises generating superheated steam, passing the superheated steam through a body of water and in contact therewith and controlling flow of steam into the body of water in accordance with a condition of steam withdrawn from the body.

8. In combination, a source of superheated steam, a desuperheater comprising a receptacle containing water, means to conduct superheated steam from said source and into said desuperheater to pass through the water therein and in contact therewith, means to withdraw saturated steam from the desuperheater and automatic means for controlling the flow of steam to the desuperheater in response to a condition of steam withdrawn from the desuperheater.

In testimony whereof I hereunto affix my signature.

FRITZ WETTSTEIN.